(12) United States Patent
Lutteman

(10) Patent No.: US 6,325,314 B1
(45) Date of Patent: Dec. 4, 2001

(54) DEVICE FOR A SPINNING REEL

(76) Inventor: Anders Lutteman, Sjogatan 34 A, S-591 30, Motala (SE)

( * ) Notice: Subject to any disclaimer, the term of this patent is extended or adjusted under 35 U.S.C. 154(b) by 0 days.

(21) Appl. No.: 09/581,028

(22) PCT Filed: Dec. 7, 1998

(86) PCT No.: PCT/SE98/02227

§ 371 Date: Aug. 4, 2000

§ 102(e) Date: Aug. 4, 2000

(87) PCT Pub. No.: WO99/29168

PCT Pub. Date: Jun. 17, 1999

(30) Foreign Application Priority Data

Dec. 8, 1997 (SE) .................................................. 9704559

(51) Int. Cl.[7] .............................................. A01K 89/017
(52) U.S. Cl. ........................................................ 242/254
(58) Field of Search .................................. 242/249, 251, 242/254

(56) References Cited

U.S. PATENT DOCUMENTS

| 871,345 | * | 11/1907 | Kleinschmidt | 242/251 |
| 871,346 | * | 11/1907 | Kleinschmidt | 242/251 |
| 2,309,574 | * | 1/1943 | Busha | 242/251 |
| 3,612,436 | | 10/1971 | Shakespeare . | |
| 4,762,290 | | 8/1988 | Emura et al. . | |
| 4,881,697 | | 11/1989 | Kaneko . | |
| 5,601,246 | | 2/1997 | Takahashi . | |

FOREIGN PATENT DOCUMENTS

| 0813810 | 12/1997 | (EP) . |
| 62-253318 | 4/1989 | (JP) . |
| 340383 | 11/1971 | (SE) . |

* cited by examiner

Primary Examiner—Emmanuel M. Marcelo
(74) Attorney, Agent, or Firm—Banner & Witcoff, Ltd.

(57) ABSTRACT

The invention relates to a device for a spinning reel for increasing the flying distance with light-weighted sinkers. The spinning reel comprises in a known way a reel frame body with first and second side frames and a spool. The device includes a thumb key running in slots in the side frames and is sideways guided by these. In a first moment, before cast, the thumb key is moved to a front position in the slots and acts on a lever arranged on a cover, the lever having a lower carrier pin which puts a first branch on a spring element, wound around a shaft, in between taps axially projecting at the periphery of a flange on the spool. Simultaneously the spool is released from the crank mechanism and can rotate freely. In a second moment, the thumb key is pressed, whereby a carrying pin, disposed on the under side of the thumb key, is moved in between the taps and when the thumb key in a third moment is drawn backwards rotates the spool in the reverse direction and give the spring element desired bias.

4 Claims, 5 Drawing Sheets

DEVICE FOR A SPINNING REEL

The present invention relates to a device for a spinning reel designed to give the spool an initial acceleration, said spinning reel comprising a reel frame body with first and second side frames, means keeping the side frames together, a cover over the first side frame, a cup covering the cover and the first side frame, a spool journalled in the side frames of the reel frame body, devices for operating the reel and a spring means Modern spinning reels are very smoothrunning as they generally are provided with high quality bearings in all rotating parts. All parts affecting operation and performance in the casting moment are in most cases made of high quality, light material. To achieve large flying distance with heavy sinkers does not cause many problems since the kinetic energy absorbed to spin up the line-filled spool is relatively small compared to the total amount of kinetic energy of the sinker.

Using light-weighted sinkers drastically reduces the flying distance as a great deal of the kinetic energy of the sinker is used to start the spool filled with line. The spools in modern casting reels are as light as can be achieved without jeopardising the strength and operation. However the line on a filled spool has a relatively big mass whose centre of gravity is located at a greater distance from the rotation axis than the mass of the spool does, which is a condition that is difficult to do something about. Therefore a spool filled with line has a large momentum of inertia that takes great deal of the kinetic energy in the initial stage, the so-called "spin-up" process, and thereby reduces the initial velocity of the sinker and the casting length is reduced. It becomes naturally to consider how the initial moment of the casting could be affected so that the initial velocity of the sinker would not be reduced by the moment of inertia of the spool filled with line.

U.S. Pat. No. 4,881,697 discloses several solutions of devices for forcibly rotating the line spool on a spinning reel. All the solutions are based on that the operator manually stretches a spring that is released at the moment of casting and via a gear affects the axis of the line spool. Both torsion spring and compression spring are suggested in the solutions. In all cases the spring force is transferred to the spool via a segmented gear, which releases the spool for rotation after the spring has transferred the energy to the spool. Some of the solutions suggested involves an extra manual operation to stretch the spring by operating a lever outside the reel or, like in a suggested solution, press a bar against a compression spring, whereby a linear segment gear on the bar transfers the spring energy to the axis of the spool.

However in the solutions suggested the spool has to be released from the crank mechanism by a first manual operation and after this the spring is stretched by a second manual operation to a stop position. The spool is prevented from being rotated by the stretched spring before casting is performed with a third manual operation when the thumb is released from the spool filled with line. Thus the device creates a casting routine with more manual operations than is normal and no possibility to easily have an influence of how much the spring is stretched. The situation with short casts from shores with reeds and bushes requires that the tension of the spring is different from that of maximum casting range. It is thus a need to easily and quickly changing the spring tension.

No other effective and rational solutions not requiring altered casting routine are known and an object of present invention is therefore to provide a device giving the line spool on a spinning reel a contribution of a desired amount of acceleration in the moment of casting without executing any additional manual operations and without any other operating means than those normally existing and that the line spool is released from the crank mechanism and hold back in a normal way by means of the usually existing thumb key. Another object is to provide a simple device by means of which the contribution of acceleration can be adapted to different weights of the sinker.

These objects are achieved by a device having the characteristics given in claim 1 and the subsequent claims.

Preferred embodiments of present invention will be explained more in detail below with reference to the accompanying drawings, on which:

Figure 1:
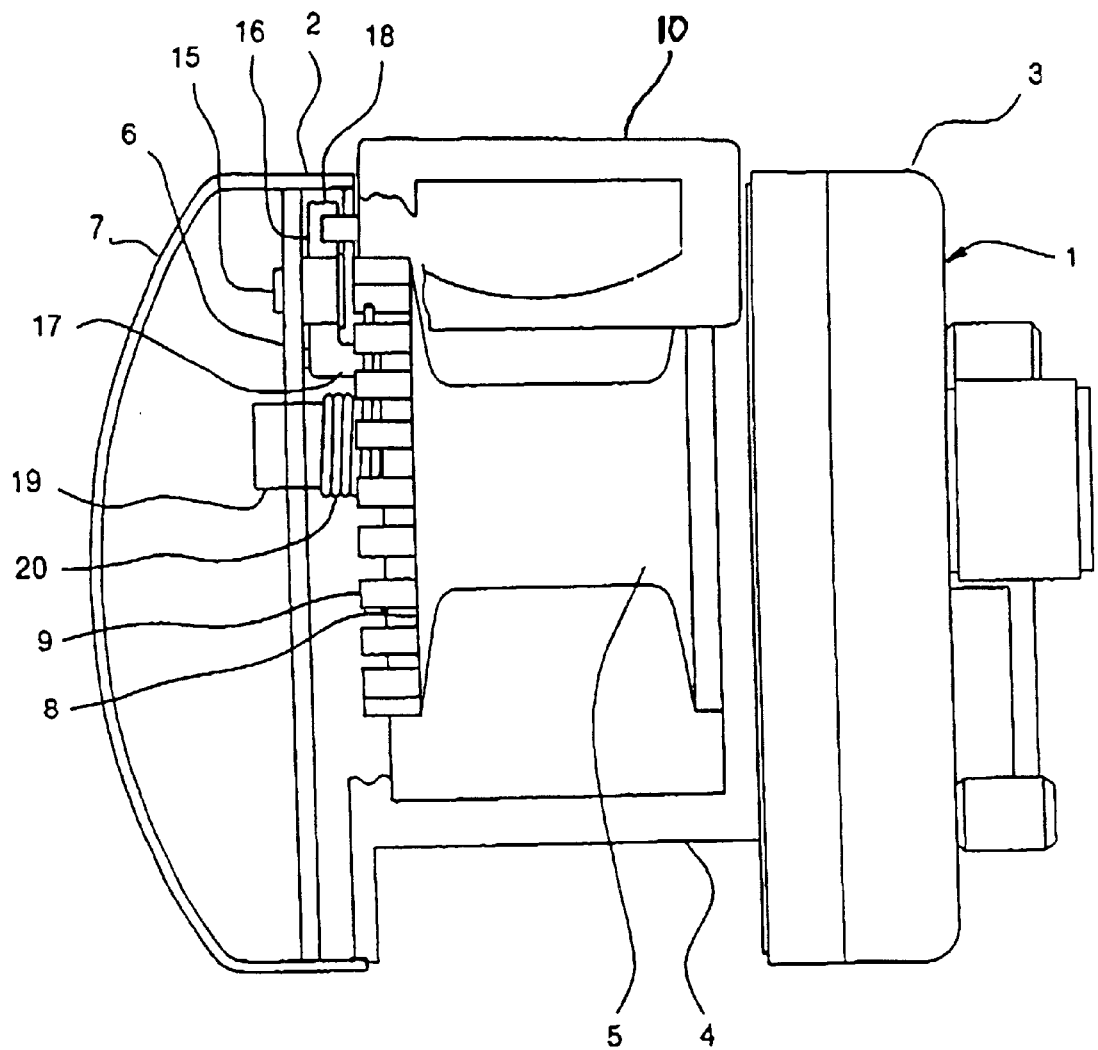
FIG. 1 shows a fragmentary plan view of a spinning reel from behind

In FIG. 1 is shown a fragmentary plan view of a spinning reel 1, which comprises a first side frame 2 and a second side frame 3, kept together by a plurality of transversal columns 4. Between the side frames is a spool 5 disposed, journalled in bearings in respective side frame. The first side frame has a cover 6 and over the cover and the side frame is a cap 7 applied. A flange 8 on the spool, facing the first side frame 2, is provided with axially projecting taps 9, evenly distributed along the periphery.

Between the first and second side frames 2 and 3 and laterally guided by them, a thumb key 10 is running. The thumb key has in its front part sideways projecting guiding pins 11 (visible in FIG. 2) running in peripherally located slots 12 inside respective side frame. The thumb key has a cupped or open central part to provide a good grasp for the thumb on the casting hand. (see FIGS. 3a–3d). In the back part a carrier pin 13 is projecting, downwardly directed towards the row of taps 9 on the flange of the spool and towards its center shaft. The thumb key is kept in an upper position by a spring 14 acting against the first side frame of the reel frame body 1, permitting the carrier pin 13 to get clear of the taps 9. A lever 16 is journalled on a shaft 15, mounted in the cover 6. The lever has a lower carrier pin 17 projecting underneath the row of taps 9 on the periphery of the spool. An upper carrier pin 18 projects inwardly, in front of the front edge of the thumb key 10. On a second shaft 19, mounted in the cover, obliquely and close to the center shaft of the spool, is a coil spring 20 wound. The spring has a first branch 21, the end of which is disposed near the inside of the taps 9 and resting against the lower carrier pin 17 on the lever 16 and keeps this against a stopper 22 (see FIGS. 3a–3d), projecting from the inside of the cover 6. A second, shorter and diametrically inwardly bent branch 23 (see FIGS. 3a–3d) on the spring 20 is put into a diametrical slot in the second shaft 19 to prevent the spring from rotating on the shaft.

Figure 3A:
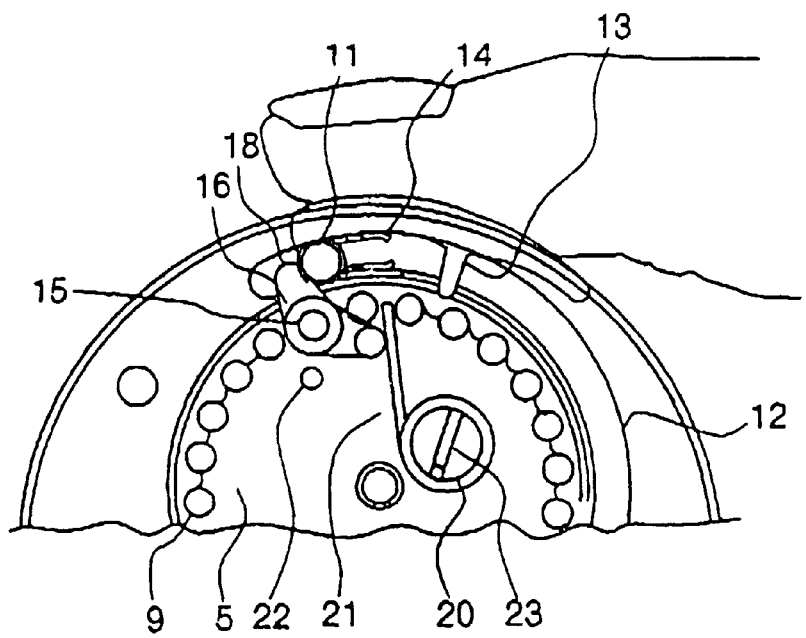
FIGS. 3a–3d show side views in a section A—A of an operating sequence at cast.
Figure 3B:
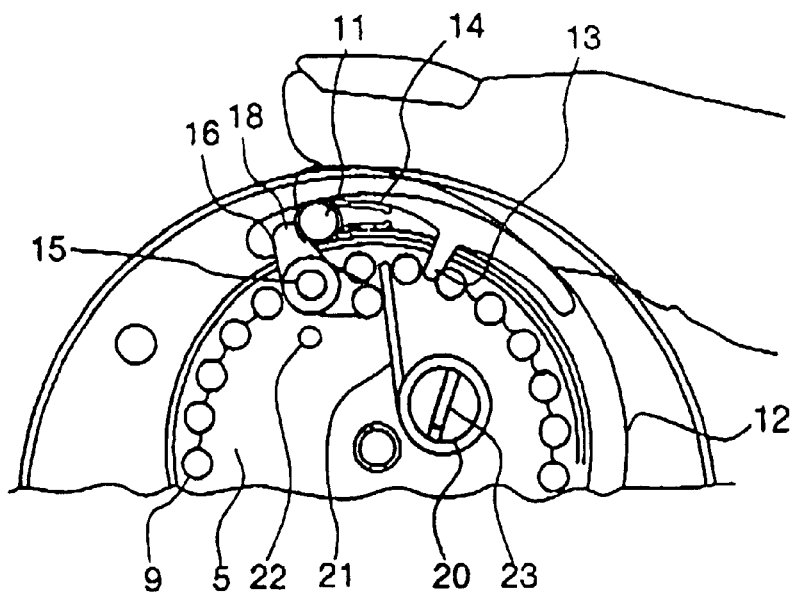
Figure 3C:
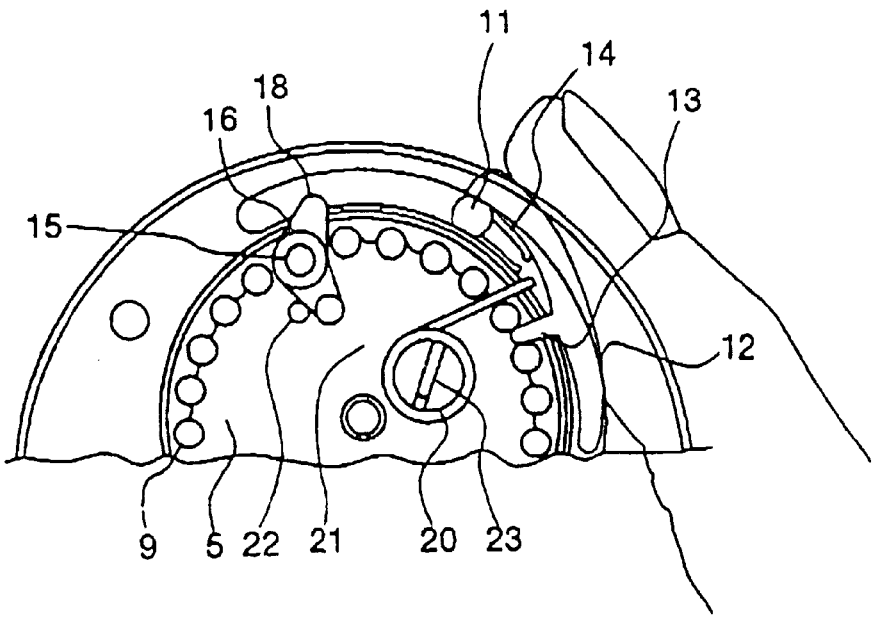
Figure 3D:
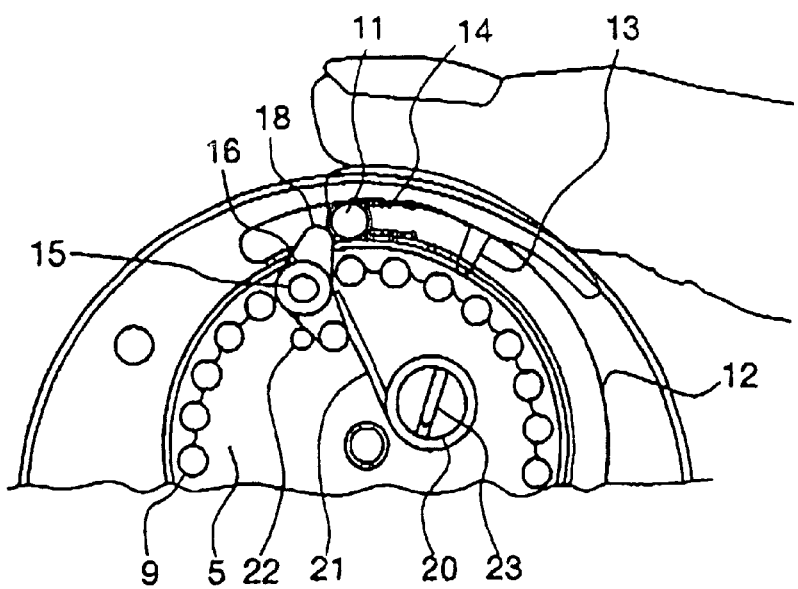

In the operation sequence in FIGS. 3a to 3d is shown how the thumb key is moved to a front position and pushes the upper carrier pin 18 forward, whereby the lever rotates and by means of the lower carrier pin 17 moves the end of the longer branch 21 on the spring 20 in between the taps 9 at the periphery of the flange 8 on the spool 5. Simultaneously the spool is released from the reel crank gear unit by an existing mechanism in the reel, which is not shown. In FIG. 3b is shown how the thumb key 10 is pressed down and the carrier pin 13 in the back part of the thumb key is moved in between the taps 9 at the periphery of the flange 8 on the spool 5. FIG. 3c shows the situation when the thumb key 10, in a pressed down position, has been moved to a rear position at the rear ends of the slots 12. The rear position can be chosen by the operator anywhere between the initial position and the rear ends of the slots 12. It depends on what initial acceleration the operator wishes to add to the spool at casting. FIG. 3d finally shows how the thumb key is released whereby the longer branch of the spring 20 transfer its energy to the spool and give this an initial acceleration, which results in that the kinetic energy of the sinker is not absorbed by spinning up the line-filled spool. Existing, not shown mechanisms in the reel bring the thumb key in a known way back to its starting position and engages the gear unit between crank and spool when the crank is operated.

To enable adapting of the acceleration to different sinker weights, the bias of the spring 20 can be changed in two further embodiments of the invention by that the second shaft 19, around which the spring is wound and attached to, can be rotated with means operated from outside the cap 7.

Figure 4:
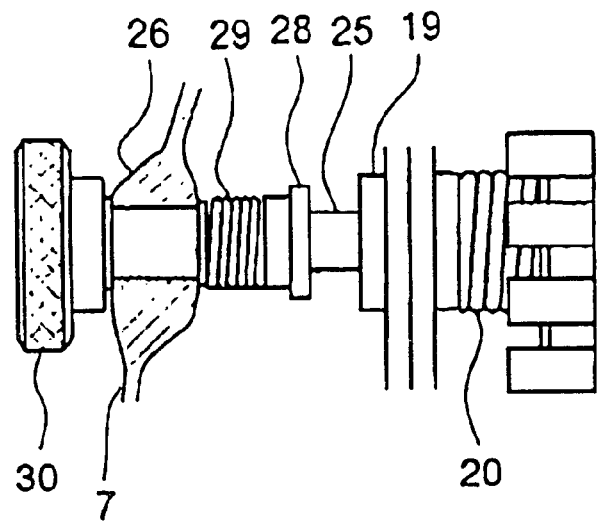
FIG. 4 shows a first adjusting device for changing of the spring tension
Figure 5:
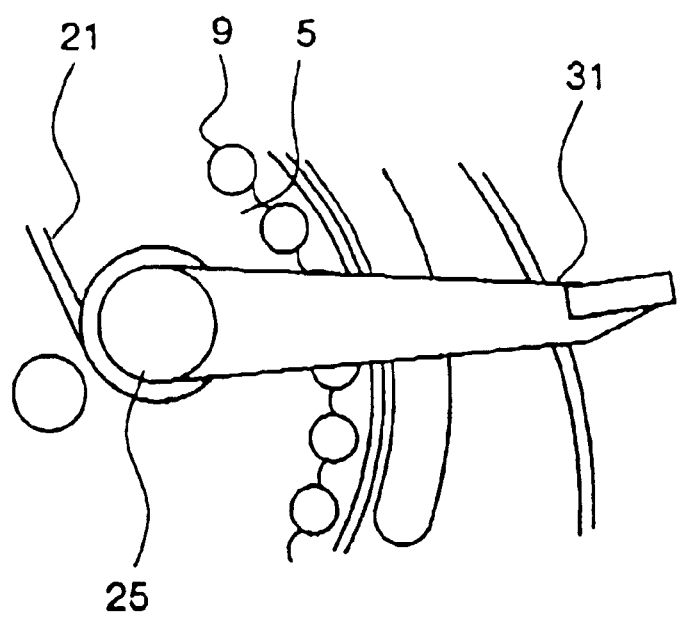
FIG. 5 shows a second adjusting device for changing of the spring tension

These preferred embodiments are evident from FIG. 4 and 5, in which two variations of adjustment devices are shown.

Figure 2:
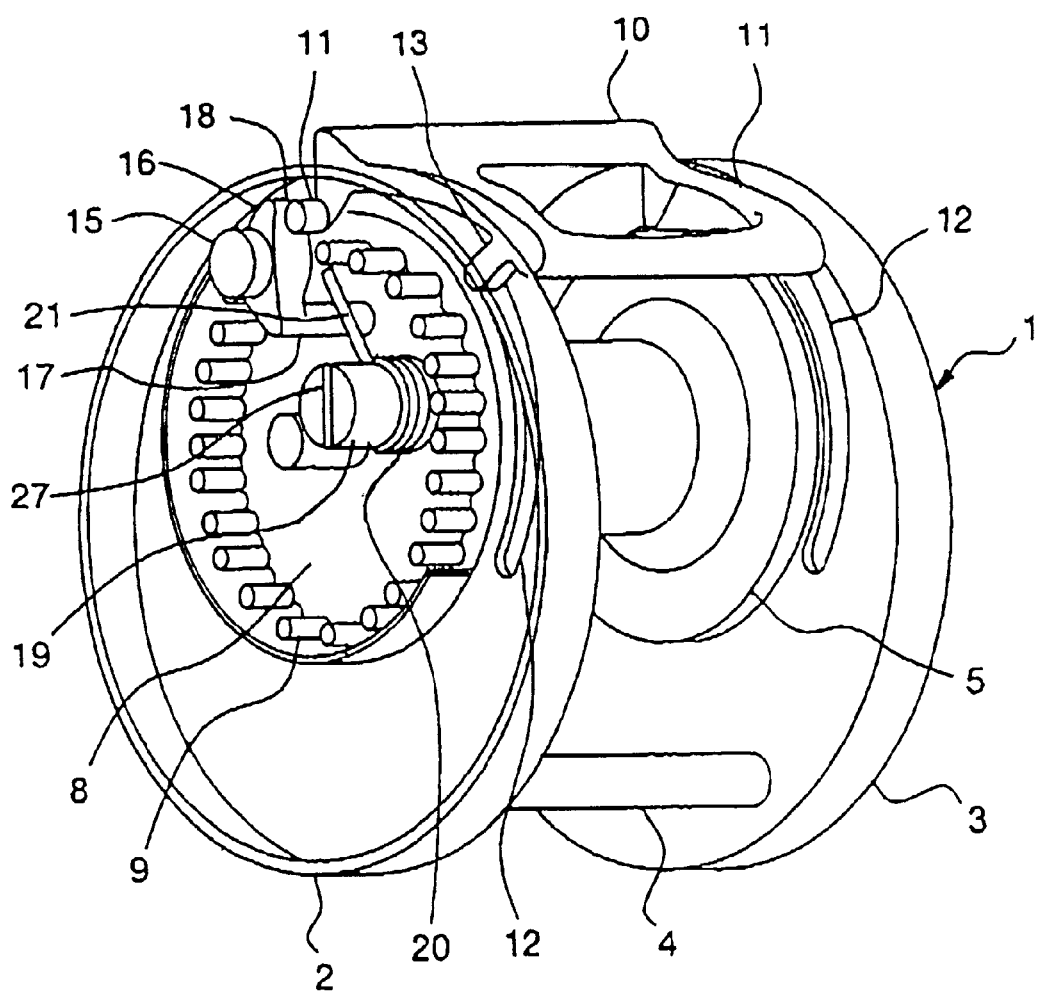
FIG. 2 shows a perspective fragmentary view of a spinning real.

The first preferred embodiment is shown in FIG. 4 in a partial view of a section of the cap 7 where a shaft 25, journalled in a bushing 26 in the outer wall of the cap has a chisel formed inner end (not visible) entering a diametrical slot 27 in the outer end of the second shaft 19 (the slot is visible in FIG. 2).

The shaft has a flange 28 and between this and the cap 7 a pressure spring is applied, which keeps a knob 30, placed on the outer end of the shaft, pressed against the cup.

The contact surfaces between the cap 7 and the knob 30 are designed to catch the knob and the shaft in a desired position but permit rotating them with the fingers to adjust the bias in the spring 20.

The second preferred embodiment is shown in FIG. 5 where a lever is fixed to the outer end of the second shaft and projects backwards, out through the cup. A slot (not shown) in the cap 7 is provided with step-by-step locking positions where the lever can be put in desired position to affect the bias in the spring 20.

What is claimed is:

1. Device for a spinning reel designed to give the spool an initial acceleration, said spinning reel comprising a reel frame body (1) with first and second side frames (2, 3), means (4) keeping the side frames together, a cover (6) on the first side frame, a cup (7) covering the cover and the first side frame, a spool (5) journalled in the side frames of the reel frame body, devices for operating the reel, and a spring means (20), characterised in that a flange (8) on the spool (5), adjacent to the first side frame (2) on the reel frame body (1), along its periphery has axially projecting taps (9) with even partition, that the spring means (20) is wound around a first shaft (19) fixed in the cover (6), that the spring means (20) has a first branch (21) projecting parallell to the flange (8) and a second diametrically inwardly bent branch (23), attached to the first shaft (19) and that the first branch (21) in a starting position rests against a lower carrier pin (17) on a lever (16), rotatably attached on a second shaft (15) in the cover (6) and which lever has an upper carrier pin (18), that a thumb key (10), guided sidewardly between the first and second side frames of the reel frame body, has guiding pins (11) sliding between front and rear end positions in slots (12) In the side frames and that the guiding pin (11) at the first side frame is in contact with the upper carrier pin (18) on the lever, that the rear part of the thumb key (10) on its underside has a carrier pin (13) above the taps (9) and directed towards the center shaft of the spool, whereby when the thumb key in a first moment is moved forward against the first carrier pin, the lever (16) rotates around the second shaft (15) so that the lower carrier pin (17) moves the end of the first branch of the spring means (20) in between the taps (9) at the periphery of the flange (8) of the spool and when the thumb key (10) in a second moment is pressed, the carrier pin (13) is likewise moved in between the taps (9) rotating the spool in the reverse direction in a third moment when the thumb key (10) is moved backwards, so that the spring (20) is given desired tension before a fourth moment when the thumb key is released and casting is carried out.

2. Device according to claim 1, characterised in that the first shaft (19) is rotatably attached in the cover (8) for adapting the bias of the spring means (20) to different sinker weights.

3. Device according to claim 2, characterised in that the shaft (19), by a knob lockable against the cup, can be rotated from outside the cup (7) by a third shaft (25) journalled in the cup (7) to give the spring means (20) desired bias.

4. Device according to claim 2, characterised in that the shaft (19) by a lever (31) applied on its end and projecting through the periphery of the cup (7), can be rotated from outside to give the spring means (20) desired bias.

* * * * *